United States Patent
Pointeau

(10) Patent No.: US 9,952,088 B2
(45) Date of Patent: Apr. 24, 2018

(54) OPTIMIZED LOCKER SYSTEM

(71) Applicant: NEOPOST TECHNOLOGIES, Bagneux (FR)

(72) Inventor: Stéphane Pointeau, Cavaillon (FR)

(73) Assignee: NEOPOST TECHNOLOGIES, Bagneaux (FR)

( * ) Notice: Subject to any disclaimer, the term of this patent is extended or adjusted under 35 U.S.C. 154(b) by 222 days.

(21) Appl. No.: 14/971,653

(22) Filed: Dec. 16, 2015

(65) Prior Publication Data

US 2016/0223388 A1    Aug. 4, 2016

(30) Foreign Application Priority Data

Jan. 30, 2015 (EP) .................................... 15305139

(51) Int. Cl.
*G01G 19/414* (2006.01)
*G01G 19/52* (2006.01)
(Continued)

(52) U.S. Cl.
CPC ......... *G01G 19/4144* (2013.01); *G01G 19/42* (2013.01); *G01G 19/52* (2013.01); *G06Q 20/208* (2013.01); *G07F 17/12* (2013.01)

(58) Field of Classification Search
CPC .... G01G 19/4144; G01G 19/42; G01G 19/52; G01G 23/01; G06Q 20/208; G07F 17/12
See application file for complete search history.

(56) References Cited

U.S. PATENT DOCUMENTS 5,056,050 A * 10/1991 Fuchs .................... G01G 23/01
                                                                702/101
5,481,464 A    1/1996 Ramsden
(Continued)

FOREIGN PATENT DOCUMENTS

FR    2851860 A1    9/2004
FR    2858448 A1    2/2005
(Continued)

OTHER PUBLICATIONS

Computer translation of FR 2,858,448 A1 (ESPACENET website operated by the EPO). Sep. 6, 2017.*
(Continued)

*Primary Examiner* — Randy Gibson
(74) *Attorney, Agent, or Firm* — Seed IP Law Group LLP

(57) ABSTRACT

Controlling deposition and retrieval of shipments via an electronic locker unit communicatively coupled a managing distribution center, and having lockable compartments, comprises entering an identification code of the shipment and retrieving specific information including a weight P0 associated with the shipment; opening a compartment of the electronic locker unit; depositing the shipment inside the compartment; weighing the shipment with a weighing module located inside the compartment and comparing the measured weight P with a reference weight; and locking the compartment and logging the compartment as filled and successfully locked upon close match and validation of weight comparison, said reference weight is an authorized weight interval between a minimal weight Pmin and a maximal weight Pmax determined by cumulating at least the two following: a carrier weight tolerance T1 corresponding to the weight P0 provided by the carrier, and a locker weight tolerance T2 of the scales of the weighing modules.

19 Claims, 3 Drawing Sheets

(51) Int. Cl.
G06Q 20/20 (2012.01)
G07F 17/12 (2006.01)
G01G 19/42 (2006.01)

(56) References Cited

U.S. PATENT DOCUMENTS

| | | | |
|---|---|---|---|
| 6,917,924 B1 | 7/2005 | Ramsden et al. | |
| 7,295,110 B2* | 11/2007 | Mercier | G07G 1/0054 |
| | | | 340/545.1 |
| 9,082,247 B2* | 7/2015 | Turner | G07F 7/00 |
| 9,354,109 B2* | 5/2016 | Izumo | G01G 23/01 |
| 2001/0045449 A1* | 11/2001 | Shannon | A47G 29/141 |
| | | | 232/19 |
| 2002/0177922 A1 | 11/2002 | Bloom | |
| 2006/0152339 A1* | 7/2006 | Mercier | G07G 1/0054 |
| | | | 340/5.73 |
| 2013/0054173 A1* | 2/2013 | Panier | G01G 23/015 |
| | | | 702/101 |

FOREIGN PATENT DOCUMENTS

| | | | |
|---|---|---|---|
| FR | 2851360 | * 11/2013 | G07C 9/00 |
| WO | 2013/170316 A1 | 11/2013 | |

OTHER PUBLICATIONS

Computer translation of FR 2,851,360 A1 (ESPACENET website operated by the EPO). Sep. 6, 2017.*
European Search Report for corresponding EP Application No. 15305139, dated Jul. 3, 2015, 2 pages.

* cited by examiner

OPTIMIZED LOCKER SYSTEM

BACKGROUND

Technical Field

The present application relates to a method and apparatus for depositing by a delivery personnel or agent, shipments into an electronic locker system comprising several lockable compartments, and for retrieving these shipments thereafter. It aims in particular at an optimized control method and unit for controlling such a modular system usually called parcel locker.

Technical Field

Parcel lockers which are today commonly used worldwide for dropping-off, storing and picking up various kinds of shipments such as packages and objects, generally prove convenient for most users.

It is known from WO 2013/170316 a system and method for delivery of one or more objects that includes the steps of determining if the object can be delivered to a first location; and in the event that the object cannot be delivered to the first location, a unique identifier is generated. The unique identifier is associated with the object and a reservation request is initiated to deliver the object to a second location. Determination of the second location is based on one or more parameters and notification of successful reservation request and second location is provided. A modular storage system having an actuator is also provided.

Similarly U.S. Pat. No. 7,295,110 relates to a locking storage device in which objects are deposited for the later removal thereof. The inventive device consists of: at least one safe-deposit box which is intended to house the object and which comprises a door and a lock, a code input device and a control unit which is designed to authorize an object to be deposited therein and subsequently removed therefrom following the entry of a removal code. The device also comprises a weight sensor which supports the weight of the safe-deposit box. The aforementioned control unit is designed to determine the weight of the object contained in the safe-deposit box once an object has been deposited therein, to determine the variation in the weight of the safe-deposit box when an object is being removed and to emit an alarm signal when the object has been removed if said variation does not correspond to the weight of the object.

Though all the previous locker systems generally prove satisfactory, improvements in the delivery process of items, packages, and transportable goods in general always remain a recurrent topic of close attention. Enhancing the quality of security regarding the delivery process therefore continues to be highly desirable. Errors often happen at any stage of the shipment process, from the delivery center to the delivery point. Thus, though the above-mentioned references disclose a weighing measurement and suggest a detection of discrepancies between the measured weight of a stored shipment and a previously recorded weight for security purposes, they do not expressly address the technical problem of weight tolerances. In fact this weight checking issue proves particularly critical for deciding to authorize or not the deposition operation of the shipments.

It is therefore desirable to provide a locker system which solves the above weight comparison problem.

BRIEF SUMMARY

An improved secure locker system for the delivery and retrieval of shipments allows managing the weighing tolerances of integrated scales in order to better ensure in particular that the shipment deposited inside the locker is the right one.

A locker system is simple to reduce into practice, user-friendly and not too expensive, and the technical adjustments of which impact its architecture as less as possible.

According to a first, a method for securely controlling the deposition and retrieval of shipments on at least an electronic locker unit connected to a managing distribution centre through a communication network, and having several lockable compartments is provided, the method comprising the following steps executed at the electronic locker unit:

entering an identification code of the shipment and retrieving specific information including a weight P0 associated with the shipment;

opening a compartment of the electronic locker unit;

depositing the shipment inside the compartment;

weighing the shipment with a weighing module located inside the compartment and comparing in a processing module the measured weight with a reference weight; and locking the compartment containing the shipment and logging the compartment as being filled and successfully locked upon close match and validation of weight comparison, characterized in that said reference weight is an authorized weight interval between a minimal weight Pmin and a maximal weight Pmax determined by cumulating at least the two following weight tolerances:

a carrier weight tolerance T1 corresponding to the weight P0 provided by the carrier; and a locker weight tolerance T2 of the scales of the weighing module.

Preferably, said authorized weight interval cumulates the three following weight tolerances: the carrier weight tolerance T1, the locker weight tolerance T2 and a range weight tolerance T3.

All these aspects provide a means for optimally determining a refined weight interval of the shipment through the use of weight tolerance levels instead of using the current raw weight included within the specific information provided by a carrier.

Advantageously, when said weight P0 is unknown (P0 set to zero) said minimal weight Pmin is set to 60 g and said maximal weight Pmax is set to 30 kg.

Preferably, the calibration of said scales of the weighing module is adjusted after their installation at a particular location for gravity variations.

Preferably, said carrier weight tolerance T1 is a fixed percentage value X (e.g., comprised between 1% and 5% of the weight P0) which is specific to the carrier.

Preferably, said locker weight tolerance T2 is a fixed percentage value Y (e.g., corresponding to 3% of the weight P0) which is specific to the locker system.

Preferably, said range weight tolerance T3 is a fixed percentage value Z1 (e.g., corresponding to 3% for a weight P0 below 1.0 kg, 2% for a weight P0 between 1.0 kg and 5.0 kg, and 1% for a weight P0 above 5.0 kg) which is specific to the relevant weight range of the shipment or said range weight tolerance is a fixed weight value Z2 (e.g., corresponding to 20 g for a weight P0 below 1.0 kg, 50 g for a weight P0 between 1.0 kg and 5.0 kg, and 100 g above 5.0 kg) which is specific to the relevant weight range of the shipment.

According to an embodiment, said authorized weight interval Pmin-Pmax is defined as follows:

$$P\min=P0(1-X/100)(1-Y/100)$$

$$P\max=P0(1+X/100)(1+Y/100)$$

According to another embodiment, said authorized weight interval Pmin-Pmax is defined as follows:

$$P\min=P0(1-X/100)(1-Y/100)(1-Z1/100)$$

$$P\max=P0(1+X/100)(1+Y/100)(1+Z1/100)$$

According to still another embodiment, said authorized weight interval Pmin-Pmax is defined as follows:

$$P\min=P0(1-X/100)(1-Y/100)-Z2$$

$$P\max=P0(1+X/100)(1+Y/100)+Z2$$

Other aspects of the invention are discussed further in the detailed description that follows.

BRIEF DESCRIPTION OF THE SEVERAL VIEWS OF THE DRAWINGS

The invention can be better understood in reading the following detailed description accompanied by illustrative and non-limiting examples with reference to the drawings, in which.

DETAILED DESCRIPTION

Figure 1:
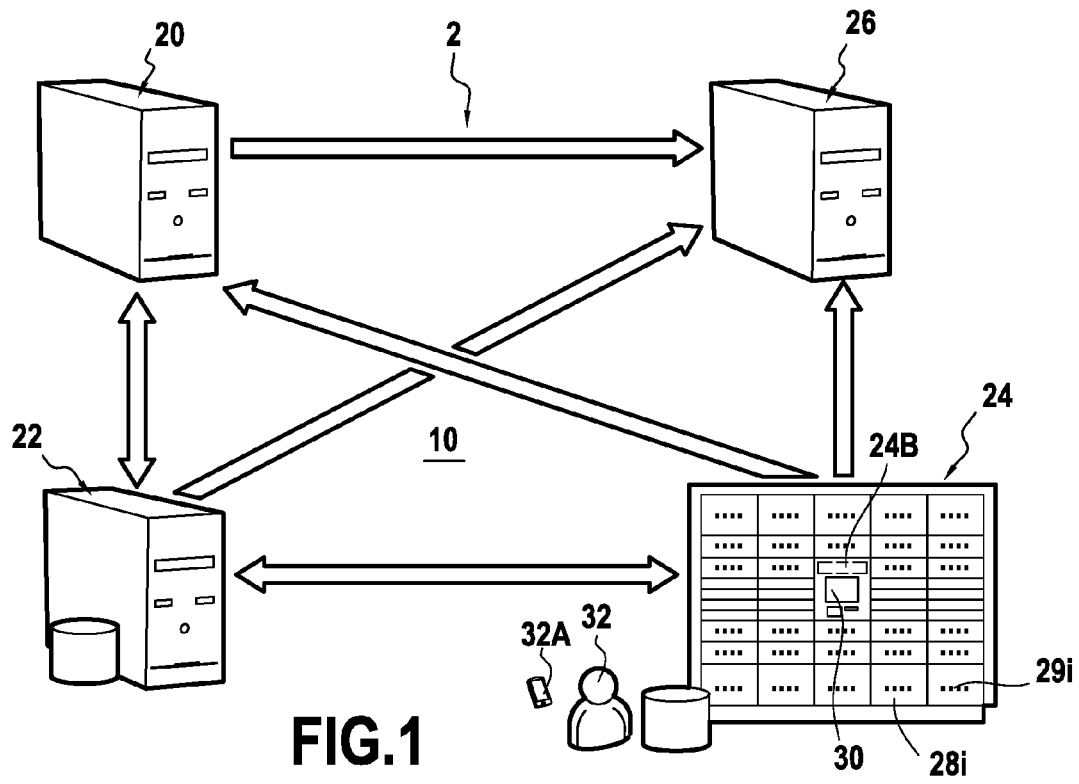
FIG. 1 schematically depicts the electronic locker system of the invention.

In a preferred embodiment of the invention, a secure locker system 2 comprises a communication network 10 linking at least a sender 20, a managing distribution centre 22, at least an electronic locker apparatus 24 and at least a recipient 26. The secure locker system is generally controlled by computer means, electronic means and mechanical means for operating the electronic locker apparatus through all its input and output means.

The electronic locker apparatus typically comprises a series of available compartments 28i of different sizes and a set 30 of monitor, scanner and keyboard or touchscreen. Each compartment comprises an automatic door and an indicating luminous sign 29i. The bottom of the electronic locker apparatus is preferably assigned to heavy or bulky shipments. The luminous indication is based on predefined preferences such as the closest position available to the delivery agent, and preferably at the bottom of the electronic locker apparatus when the shipment is determined as bulky or heavy.

Figure 2:
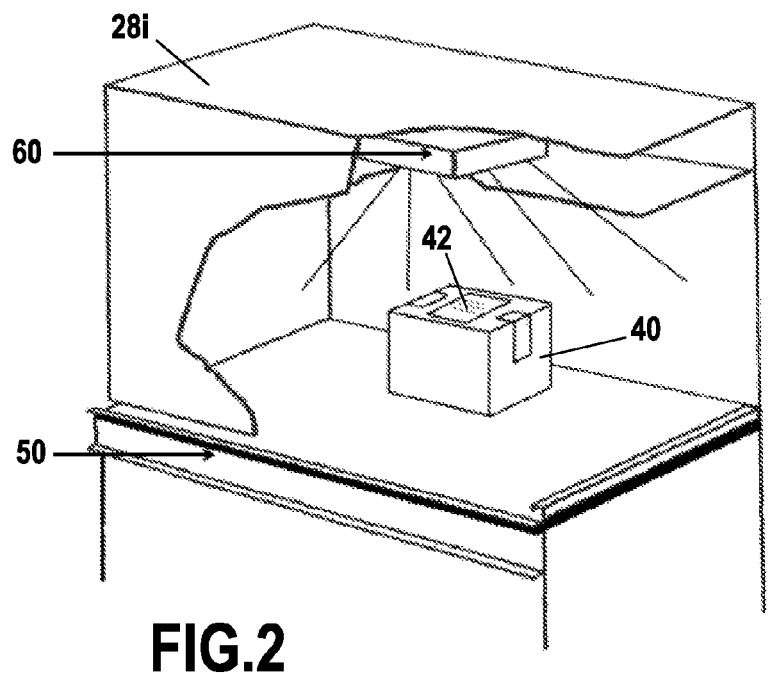
FIG. 2 is a perspective view of a compartment of an electronic locker apparatus in accordance with the invention.
Figure 3A:
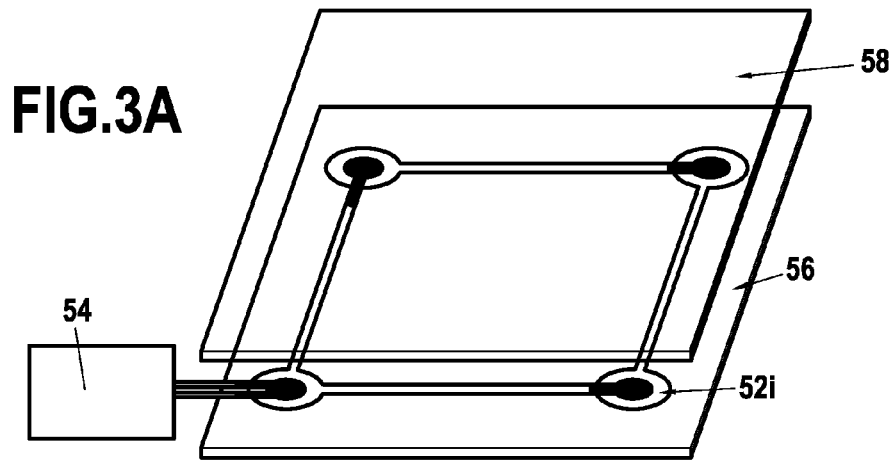
FIG. 3A and FIG. 3B are schematic top and side views of weighing means associated with the compartment of FIG. 2.
Figure 3B:
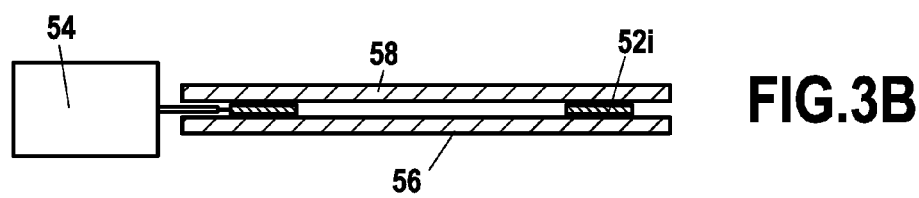

FIG. 2 illustrates a compartment for depositing a shipment such as a parcel or package 40. For tracking purposes, the parcel bears a standard identification means 42 of any kind such as a barcode and/or a RFID tag. Each compartment comprises at least a weighing device 50. In a particular embodiment, each compartment can also comprise a sensing device 60 for verifying the presence of the shipment. As illustrated on FIGS. 3A and 3B, each weighing device comprises preferably a series of thin force sensors 52i linked together to a circuit board 54, attached to a lower base 56, and located under an upper bearing plate 58.

Figure 4:
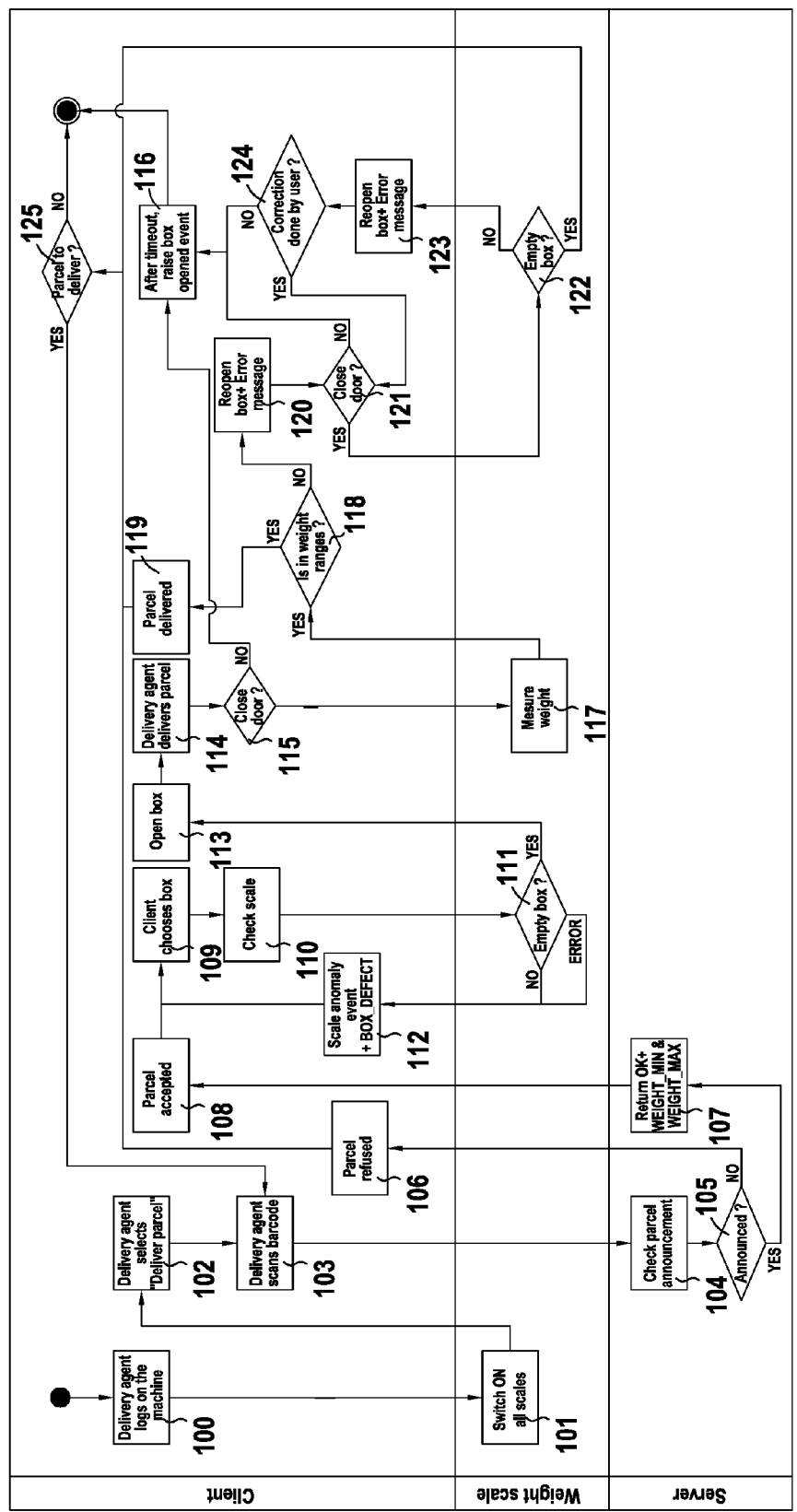
FIG. 4 schematically illustrates the weight calculation in accordance with the invention.

The operation on the electronic locker apparatus in a shipment delivery mode is summarized below in view of FIG. 4.

In a first steps 100, the delivery agent logs on the locker unit for example via the keyboard 30 of the electronic locker apparatus ("locker unit" in the following description). In a second step 101, the control software of the locker unit activates all scales of the locker unit; if scales cannot be switched on, an out of order message is displayed on screen. In a following step 102, the delivery agent selects a "Deliver parcels" function on a displayed menu on the touchscreen 30 and in a step 103 scans the barcode of a first parcel with the scanner 30 to enter the identification code.

In a further step 104, the locker unit sends the parcel identification code to the managing distribution centre. At step 105, the managing distribution centre checks if the parcel is declared. In case of a negative response, a refusal message NOK is returned and the parcel is rejected and will not be delivered (step 106). If Yes (positive response at the test of step 105) two values Pmin and Pmax are set and a message OK is returned to the locker unit with the relevant authorized Pmin-Pmax weight interval calculated in a step 107 according to the invention and explained below in view of FIG. 5. The parcel is then accepted for further processing (step 108).

In the following step 109 the control software of the locker unit determines a suitable compartment and in a step 110 a check is performed with the relevant scale to detect if the compartment is empty. At step 111, the value returned by the scale is verified. In case of a negative response at this test, meaning that the compartment is not empty, an event is generated corresponding to an error or problem, and sent to the managing distribution centre; the compartment is declared as defective and another compartment is selected (step 112). Otherwise, the operating process continues and the control software of the locker unit opens the selected compartment (step 113).

In a further step 114 the delivery agent puts the parcel in the compartment and closes the compartment's door (step 115). In case of an error or problem (step 116) the compartment is declared as defective and an error event is sent to the managing distribution centre. Otherwise, the weight of the parcel is measured with the weighing device 50 (step 117). At step 118, the measured weight P is compared to the authorized weight interval Pmin-Pmax. If weight P is within the authorized weight interval Pmin-Pmax, then the parcel is considered as delivered (step 119); the measured weight P is stored and a "Parcel Delivered" event is sent to the managing distribution centre. If weight P is outside the authorized weight interval Pmin-Pmax (negative response at the test of step 118), then the parcel is not considered as delivered. The compartment is reopened and the delivery agent is asked to remove the parcel and further close the compartment. A "weight out of bounds" event is generated and sent to the managing distribution centre (step 120). The reason might be a problem with the scale or the weight declaration. At step 121, the locker unit checks whether the compartment is closed. In case of a negative response, an error is generated and sent to the managing distribution centre (return to step 116). If the compartment is closed (positive response at the test of step 121), a new test at a step 122 is made to determine if the compartment is empty, for instance with the presence sensor 60. The compartment's door reopens when the compartment is not recognized as empty and an error message is sent to the managing distribution centre (step 123). At step 124, the locker unit checks whether the delivery agent has removed the parcel thus correcting the previous error. In case of a positive response, the door is closed, the check of this closing can be made at the step 121. Otherwise, a "box open" event is generated and sent to the managing distribution centre (return to step 116).

In the final step 125 the delivery agent can now either proceed with next parcel by returning to step 103 or stop and return to home page of the touchscreen 30.

In summary, when the delivery agent 32 scans the ID code 42 on parcel 40, a checking operation is performed in the managing distribution centre 22 to confirm the declaration of the parcel. If it is the case, all information on the parcel is retrieved, in particular its authorized weight interval Pmin-Pmax, and sent to the locker unit.

As soon as the delivery agent closes the compartment 28$i$ after deposition of the parcel, this latter is weighed. If its weight P is within the stored authorized weight interval Pmin-Pmax, then the parcel is accepted; otherwise the compartment opens again and the delivery agent is asked to remove the parcel.

When the delivery agent closes a presumed empty compartment, a checking operation is performed with the weighing module for confirming this state; otherwise the compartment opens again and the delivery agent is asked to remove the parcel.

Figure 5:
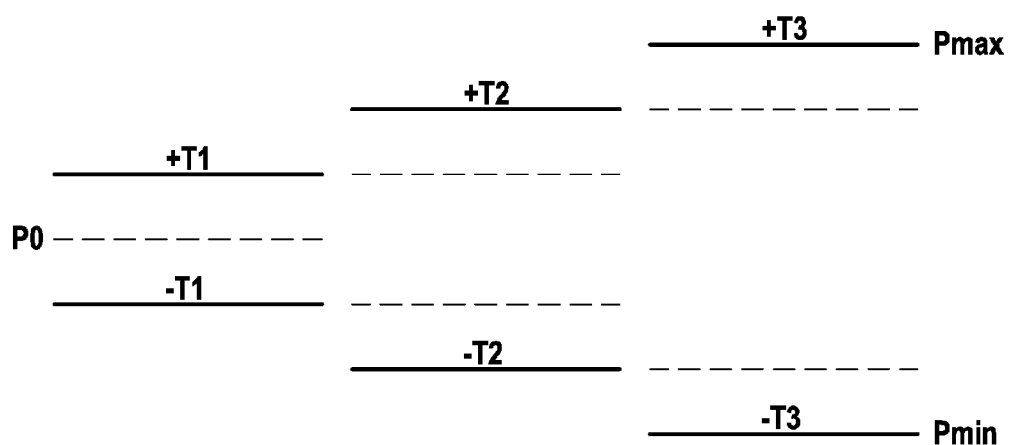
FIG. 5 is a flow chart which illustrates the successive operating steps of the locker control method according to the invention that relate to the shipment delivery mode.

The determination of the authorized weight interval Pmin-Pmax is now explained with reference to FIG. 5. According to the invention, the weight calculation is done in accordance with a declared weight P0 and three tolerances T1, T2, T3:

the carrier who uses specific scales with their own tolerance T1;
the parcel locker with its own scales and tolerance T2; and
the declared shipment weight the tolerance T3 of which differs according to its relevant weight range Pi, Pi+1.

The calculation of the minimum Pmin and maximum Pmax weights authorized for a parcel with a declared weight P0 is carried out by taking successively the tolerances defined as follows into account. Here are the successive steps of calculation in which:

X is the weight tolerance value of the carrier
Y is the weight tolerance value of the locker
Z is the weight tolerance value of the weight range

| Calculation step | Minimum weight Pmin | Maximum weight Pmax |
|---|---|---|
| Carrier tolerance | A = P0 * (1 − X/100) | A = P0 * (1 + X/100) |
| Locker tolerance | B = A * (1 − Y/100) | B = A * (1 + Y/100) |
| Weight range tolerance (%) | C = B * (1 − Z/100) | C = B * (1 + Z/100) |
| or | or | or |
| Weight range tolerance (value) | C = B − Z | C = B + Z |

Example 1

Carrier tolerance: 4%
Locker tolerance: 3%
Weight range tolerance: 2%
Declared parcel weight: 1,200 g
Calculation of authorized minimum weight Pmin:

1,200*(1−4/100)=1,152 g 1,152*(1−3/100)=1,117.44 g 1,117.44*(1−2/100)=1,095.09=1,095 g

Calculation of authorized maximum weight Pmax:

1,200*(1+4/100)=1,248 g 1,248*(1+3/100)=1,285.44 g 1,285.44*(1+2/100)=1,311.14=1,311 g

Example 2

Carrier tolerance: 4%
Locker tolerance: 3%
Weight range tolerance: 50 g
Declared parcel weight: 1,200 g
Calculation of authorized minimum weight Pmin:

1,200*(1−4/100)=1,152 g 1,152*(1−3/100)=1,117.44 g 1,117.44−50=1,087.44=1,067 g

Calculation of authorized maximum weight Pmax:

1,200*(1+4/100)=1,248 g 1,248*(1+3/100)=1,285.44 g 1,285.44+50=1315.44=1,335 g

According to the carrier, weight tolerance T1 is a fixed percentage that has a value X comprised between 1% and 5% of the weight P0.

According to the locker system, weight tolerance T2 is a fixed percentage that has a value Y comprised between 1% and 5% of the weight P0. It preferably takes into account the external environment variations such as vibrations and temperature and humidity changes.

According to the weight range of the shipment, weight tolerance T3 is:

either a fixed percentage that has preferably a value Z1 corresponding to 3% for a weight P0 below 1.0 kg, 2% for a weight P0 between 1.0 kg and 5.0 kg and 1% for a weight P0 above 5.0 kg; or a fixed weight value Z2, e.g., 20 g for a weight P0 below 1.0 kg, 50 g for a weight P0 between 1.0 kg and 5.0 kg and 100 g for a weight P0 above 5.0 kg.

If P0 is unknown or set to 0, then the weighing system sets a default Pmin-Pmax couple with Pmin equal to 60 g and Pmax equal to 30 kg.

Additional modifications and improvements of the present invention may also be apparent to those of ordinary skill in the art. Thus, the particular combination of steps described and illustrated herein is intended to represent only one embodiment of the present invention, and does not serve as a limitation of alternative methods within the spirit and scope of the invention.

For instance, the values X, Y, Z may be stored in a database of the locker unit and the calculation of the authorized weight interval Pmin-Pmax performed by the locker unit.

The specific information can also be recorded in a remote database distinct from the managing distribution database and accessible by the electronic locker unit. This information can also be downloaded into a mobile terminal 32A of the delivery agent when leaving the managing distribution centre. It can further be transmitted to the locker unit along with the scanning of the parcel identification code.

The authorized weight interval Pmin-Pmax can be defined by differently cumulating weight tolerances T1, T2, T3.

The invention claimed is:

1. A method for securely controlling the deposition and retrieval of shipments on at least an electronic locker unit connected to a managing distribution centre through a communication network, and having several lockable compartments, the method comprising the following executed at the electronic locker unit:

entering an identification code of the shipment and retrieving specific information including a weight P0 associated with the shipment;

opening a compartment of the electronic locker unit;

depositing the shipment inside the compartment;

weighing the shipment with a weighing module located inside the compartment and comparing in a processing module the measured weight P with a reference weight; and locking the compartment containing the shipment and logging the compartment as being filled and successfully locked upon close match and validation of weight comparison, wherein said reference weight is an authorized weight interval between a minimal weight Pmin and a maximal weight Pmax determined by cumulating at least the two following weight tolerances:

a carrier weight tolerance T1 corresponding to the weight P0 provided by the carrier; and a locker weight tolerance T2 of the scales of the weighing modules.

2. The method of claim 1, wherein said authorized weight interval cumulates the three following weight tolerances: said carrier weight tolerance T1, said locker weight tolerance T2 and a range weight tolerance T3.

3. The method of claim 2, wherein the calibration of said scales of the weighing modules is adjusted after their installation at a particular location for gravity variations.

4. The method of claim 2, wherein said carrier weight tolerance T1 has a fixed percentage value X which is specific to the carrier.

5. The method of claim 4, wherein said fixed percentage value X is comprised between 1% and 5% of the weight P0.

6. The method of claim 2, wherein said locker weight tolerance T2 which takes into account the external environment variations such as vibrations, and temperature and humidity changes, has a fixed percentage value Y which is specific to the locker system.

7. The method of claim 6, wherein said fixed percentage value Y is comprised between 1% and 5% of the weight P0.

8. The method of claim 2, wherein said range weight tolerance T3 has a fixed percentage value Z1 which is specific to the relevant weight range of the shipment.

9. The method of claim 8, wherein said fixed percentage value Z1 corresponds to 3% for a weight P0 below 1.0 kg, 2% for a weight P0 between 1.0 kg and 5.0 kg, and 1% for a weight P0 above 5.0 kg.

10. The method of claim 2, wherein said range weight tolerance T3 has a fixed weight value Z2 which is specific to the relevant weight range of the shipment.

11. The method of claim 10, wherein said fixed weight value Z2 corresponds to 20 g for a weight P0 below 1.0 kg, 50 g for a weight P0 between 1.0 kg and 5.0 kg, and 100 g for a weight P0 above 5.0 kg.

12. The method of claim 1, wherein when said weight P0 is unknown or set to zero, said minimal weight Pmin is set to 60 g and said maximal weight Pmax is set to 30 kg.

13. The method of claim 1, wherein said authorized weight interval Pmin-Pmax is defined as follows:

$$P\text{min}=P0(1-X/100)(1-Y/100)$$

$$P\text{max}=P0(1+X/100)(1+Y/100).$$

14. The method of claim 8, wherein said authorized weight interval Pmin-Pmax is defined as follows:

$$P\text{min}=P0(1-X/100)(1-Y/100)(1-Z1/100)$$

$$P\text{max}=P0(1+X/100)(1+Y/100)(1+Z1/100).$$

15. The method of claim 10, wherein said authorized weight interval Pmin-Pmax is defined as follows:

$$P\text{min}=P0(1-X/100)(1-Y/100)-Z2$$

$$P\text{max}=P0(1+X/100)(1+Y/100)+Z2.$$

16. The method of claim 1, wherein the calibration of said scales of the weighing modules is adjusted after their installation at a particular location for gravity variations.

17. The method of claim 1, wherein said carrier weight tolerance T1 has a fixed percentage value X which is specific to the carrier.

18. The method of claim 17, wherein said fixed percentage value X is comprised between 1% and 5% of the weight P0.

19. The method of claim 1, wherein said locker weight tolerance T2 which takes into account the external environment variations such as vibrations, and temperature and humidity changes, has a fixed percentage value Y which is specific to the locker system.

* * * * *

UNITED STATES PATENT AND TRADEMARK OFFICE
CERTIFICATE OF CORRECTION

PATENT NO. : 9,952,088 B2
APPLICATION NO. : 14/971653
DATED : April 24, 2018
INVENTOR(S) : Stéphane Pointeau Page 1 of 1

It is certified that error appears in the above-identified patent and that said Letters Patent is hereby corrected as shown below:

On the Title Page

Item (73) Assignee:
"NEOPOST TECHNOLOGIES, Bagneaux (FR)" should read, --NEOPOST TECHNOLOGIES, Bagneux (FR)--.

Item (57) Abstract:
"locker unit communicatively coupled a managing distribution center" should read, --locker unit communicatively coupled to a managing distribution center--.

Signed and Sealed this
Twenty-eighth Day of August, 2018

Andrei Iancu
*Director of the United States Patent and Trademark Office*